C. A. HYDE.
SAFETY BOLT AND SAFETY FASTENER THEREFOR.
APPLICATION FILED FEB. 9, 1914.
1,167,697.
Patented Jan. 11, 1916.
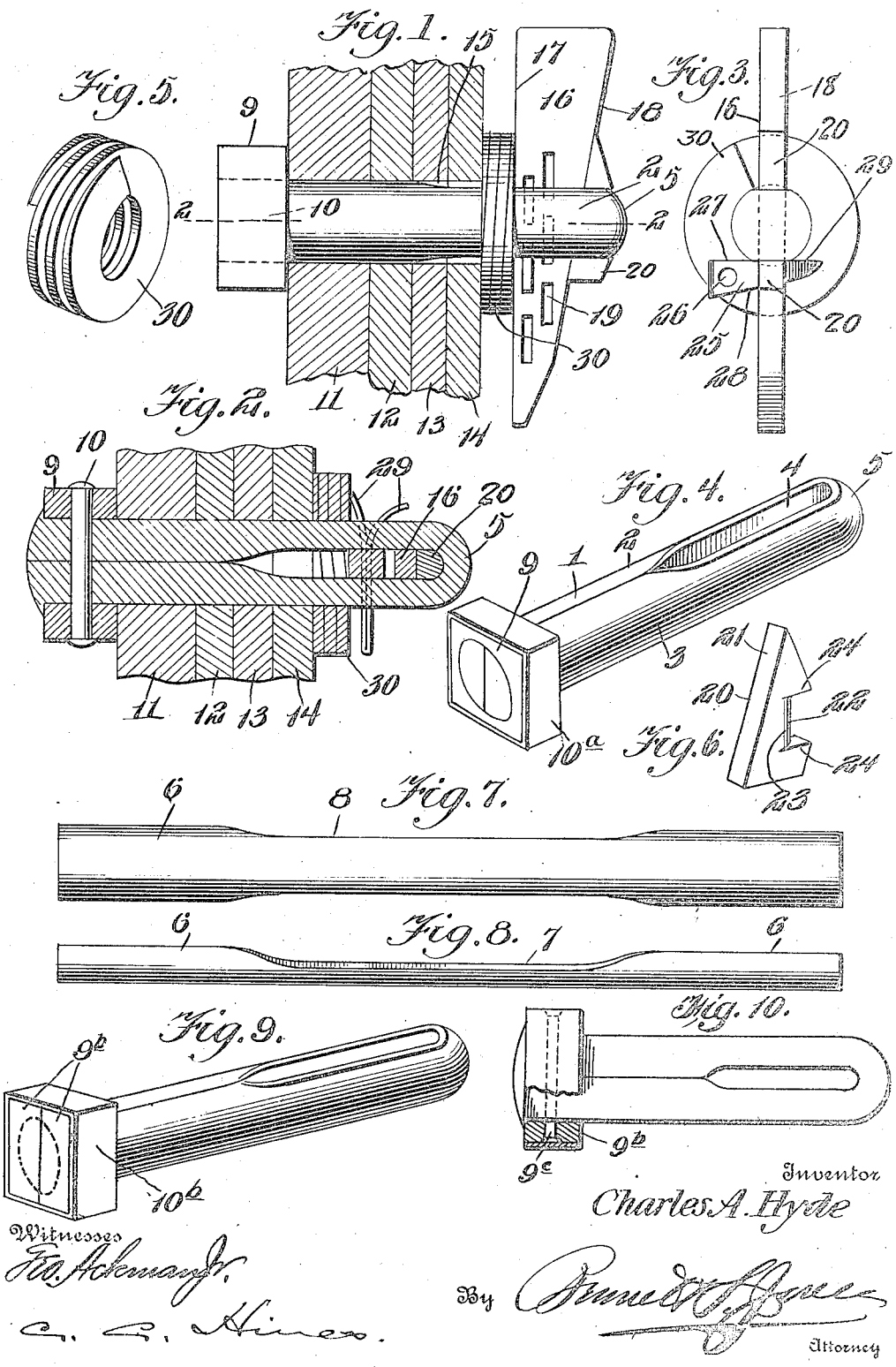

UNITED STATES PATENT OFFICE.

CHARLES A. HYDE, OF CLEAR SPRING, MARYLAND.

SAFETY-BOLT AND SAFETY-FASTENER THEREFOR.

1,167,697.  Specification of Letters Patent.  Patented Jan. 11, 1916.

Application filed February 9, 1914. Serial No. 817,639.

*To all whom it may concern:*

Be it known that I, CHARLES A. HYDE, a citizen of the United States, residing at Clear Spring, in the county of Washington and State of Maryland, have invented certain new and useful Improvements in Safety-Bolts and Safety-Fasteners Therefor, of which the following is a specification.

This invention relates to safety bolts and safety fastenings therefor, the principal object of the invention being to provide a bolt which is not liable to break under strain and a fastening which is not liable to become displaced or work loose, thereby providing a bolt and fastening effectually adapted for use in connecting railway rails or coupling other elements where strength, durability and safety are important factors.

A further object of the invention is to provide a threadless bolt drawn or rolled out, lapped and welded, and provided with an anti-splitting head, and a fastening means adapted for coöperation with the slotted bolt in such a way as to obviate liability of the parts becoming loose or misplaced or rattling under various conditions of service.

The invention consists in the features of construction, combination and arrangement of parts, hereinafter fully described and claimed, reference being had to the accompanying drawings, and in which:—

Figure 1 is a sectional view through connected elements, such as railway rails and fish plates, united by my improved bolt and fastening; Fig. 2 is a section taken substantially on the line 2—2 in Fig. 1; Fig. 3 is an end elevation of the parts shown in Figs. 1 and 2; Fig. 4 is a perspective view of the bolt shown therein; Fig. 5 is a perspective view of the coiled wear-take-up and anti-rattling spring; Fig. 6 is a perspective view of the wedge seat piece; Figs. 7 and 8 are side and edge views of a form of blank from which the bolt shown in Fig. 4 is made; Fig. 9 is a perspective view of a modified form of bolt; and Fig. 10 is a side elevation, partially in section, of still another modified form of bolt.

Referring to Figs. 1 to 8, inclusive, of the drawings, 1 designates my improved longitudinally slotted safety bolt, which is of a threadless type and composed of a pair of parallel longitudinally extending limbs 2 and 3 provided with a longitudinal slot 4 and integrally united at one end of the bolt by a bight, bridge or return portion 5. The slot 4 is substantially coextensive in length with the half of the bolt in which it is formed, the free ends of the limbs 2 and 3 forming the remaining half of the bolt having flattened sides which lie in contact and are welded together. The bolt thus constructed is made from the form of blank 6 shown in Figs. 7 and 8, the said blank being made from drawn iron rolled out into shape, so as to insure maximum strength and durability. The blank is semi-circular or half round in cross section, and intermediately of its length its inner face and sides are cut away, as shown at 7 and 8, respectively, so that by bending or folding the ends of the bolt blank into parallel relation and welding the same together a bolt of the form shown will be produced.

The solid or non-slotted end of the bolt may be provided with a head band, collar or head 9, shrunk or welded thereon, and additionally secured thereto by a rivet 10, if desired, the band 9 providing a non-splitting head which will not become mashed or fractured or pulled off the bolt shank under any of the usual strains to which the bolt is subjected. In Figs. 1 and 2 I have shown the bolt employed for connecting a series of elements 11, 12, 13 and 14 together, which elements are provided with registering openings 15 through which the bolt extends. The band or head 9 is arranged to bear against the outer side of the element 11 and in order to hold the bolt against displacement, I provide safety fastening means for coöperation with the slotted end thereof. This fastening means comprises a metallic fastening wedge 16 having a straight edge 17, an inclined side 18 and a plurality of series of longitudinal slots 19, the slots of each series being arranged to break joint with or on lines between the slots of the other series, providing for an adjustable fastening of the bolt in position, as hereinafter described. The wedge is inserted with its reduced end foremost through the slot 4 in the bolt, with its straight edge 17 facing the adjacent element 14 and its inclined edge 18 facing the bight or return portion 5 of the bolt. For the purpose of insuring an effective wedging action and relieving the bolt itself from wear at the point 5, I provide a substantially triangular wedge seat piece or plate 20 having an inclined edge 21 and formed in its apex or at the angle of intersection of its other inclined sides a notch or recess 22, the inner wall 23 of which is transversely curved or rounded. This seat piece is fitted in the bolt slot 4 between the part 5 and the inclined edge 18 of the bolt so that the notch 22 receives the part 5 and the shoulders 24 produced at the sides of the notch engage the opposite edges of the part 5 and thereby hold the seat piece locked against any possibility of displacement. The curved edge 23 in this arrangement of the parts engages the inner surface of the return portion 5 and insures a firm connection therewith without excessive wear thereon. When the parts are so applied the inclined edge 18 of the bolt lies in contact with the inclined edge 21 of the wedge, which forms a coöperating inclined slot upon the bolt so that upon the insertion of the wedge a proper wedging action will be established.

To fasten the wedge in position against loosening or displacement, and to enable it to be drawn up firmly in position, I provide a key in the form of a cotter pin 25 composed of a folded wedge shaped strip of metal having adjacent its fold an opening 26 by which it may be connected by a chain or other fastening to one of the elements to be joined or any fixed part of a structure on which the bolt is used to prevent loss or displacement of the key. This key has a straight edge 27 and an inclined edge 28 and is adapted to be inserted through one of the slots 19 on the under side of the bolt as shown in Fig. 1 and to have its free end portions 29 bent laterally in opposite directions as shown in Fig. 2, to hold it from withdrawal. When the key is inserted it will be obvious that through its tapering formation a wedging action will be instituted to draw the fastening wedge 16 tightly into place, thus insuring the firm retention of said fastening. In practice, it is preferred to employ a coiled cushioning and wear-take-up spring 30 about the bolt between the straight edge 17 of the fastening wedge and the adjacent element 14, which spring is fully compressed when the wedge is fastened in position, so that in the event of any wear the spring will expand and take up all looseness of the parts, obviating all liability of play or displacement and effectually preventing the parts from rattling. As wear occurs it will, of course, be obvious that the slots 19 permit the fastening wedge to be inserted further through the bolt slot, and the key to be engaged with the proper slot in the wedge to draw the same up tight and firmly fasten it in position. It will thus be seen that as the bolt is held in position by a fastening wedge, which, in turn, is drawn up tight and locked by a wedge key, the bolt will be held against any possible play or displacement, and that if any looseness of the parts should take place through wear, this will be compensated for by the expansion of the spring. The bolt 1 being formed from a drawn and rolled out blank bent into shape and having its approximating portions welded together, it will be evident that a bolt of maximum strength to resist all imposed strains is produced, and that the strength of the bolt is increased by the shrunk on or welded band 9, which cannot possibly become mashed under any ordinary conditions of service or be stripped from the bolt.

Various modifications of the invention may be resorted to as occasion requires. In Fig. 4 I have shown the bolt provided with a head band 9$^a$ and a reinforcing band 10$^a$ shrunk or welded on to the head band. In Fig. 9 I have shown a slightly different form of bolt in which, in lieu of the head band 9, the bolt is provided with integral enlargements 9$^b$ forming a head and which are welded together or held by a reinforcing band 10$^b$ shrunk or welded thereon, or both welded and externally banded, as preferred. In Fig. 10 I have shown another form of bolt of the general character described. In the different forms of the invention employing bands or heads, it will, of course, be understood that the adjacent end of the bolt may be riveted, thus further increasing the strength and durability of the bolt. It is preferable in all cases to have the headed ends of the bolts of square or angular form so that a solid body may be presented against which a hammer or other heavy object may be held to stay the bolt while the wedge is being driven home.

From the foregoing description, taken in connection with the accompanying drawings, the construction and mode of use of my improved safety bolt and safety fastening will be readily understood and the advantages thereof appreciated. While I have shown in the accompanying drawings certain forms of my invention, and indicated certain uses therefor, it will of course be understood that I do not wish to be restricted in these particulars, as the bolts and fastenings may be employed generally for any and all purposes for which they are adapted in use.

Having thus described my invention, I claim:

1. A bolt having a head composed of welded portions, and a band encircling said head and reinforcing the same.

2. A bolt having a head composed of welded portions, and a reinforcing band encircling the head and welded thereto.

3. A bolt having a shank formed of portions welded together, and a head formed of portions welded together, and a band inclosing the head and reinforcing the same.

4. A bolt having a shank composed of welded portions and a head composed of welded portions, and a reinforcing band surrounding the head and welded thereto.

5. A bolt formed of a length of material folded to provide a shank, and having the portions thereof welded together, and also having a head composed of welded portions, and a reinforcing band surrounding the head and welded thereto.

6. A bolt formed from a folded blank, having its portions welded together, and having a head welded thereon, and a reinforcing element welded to the head.

7. In a bolt and fastening, a bolt having a longitudinal slot at one end thereof, a notched seat piece engaging the slotted end of the bolt, a slotted fastening wedge passing through the bolt slot and engaging the seat piece, and a wedge key passing through the fastening wedge and securing it in position.

8. In a bolt and fastening, a bolt having a longitudinal slot, a notched seat piece fitted in the slot and engaging the end of the bolt, a slotted fastening wedge passing through the bolt slot, a wedge key engaging the slotted fastening wedge and having bendable portions to hold it against dislocation, and a coiled spring adapted to surround the bolt between the wedge and the part to be secured.

In testimony whereof I affix my signature in presence of two witnesses.

CHARLES A. HYDE.

Witnesses:
    D. ELMER WOLF,
    PALMER TENNANT.